Oct. 4, 1932.  B. J. UKROPINA  1,880,599
CONCRETE PIPE JOINT
Filed Jan. 17, 1931
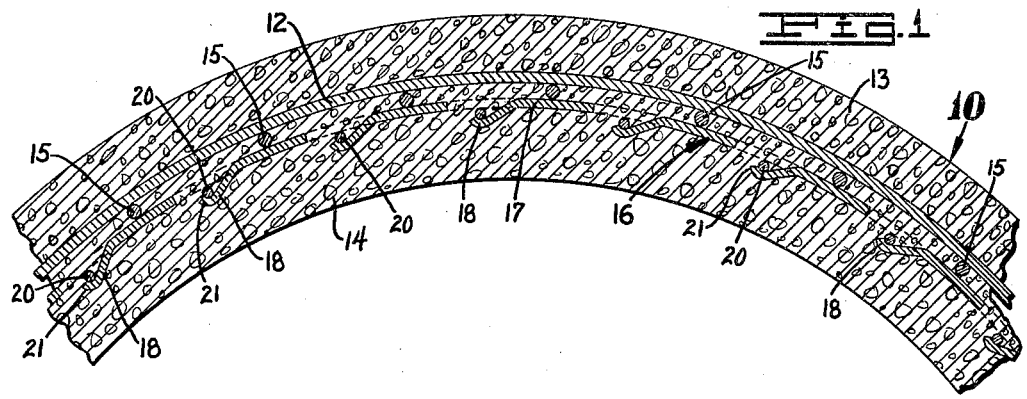
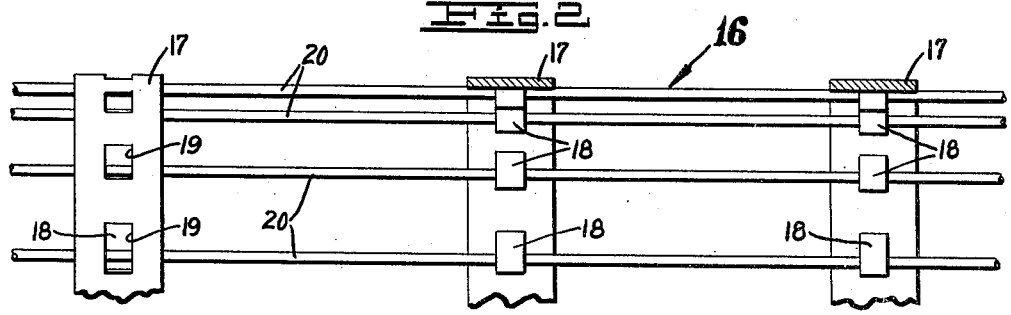
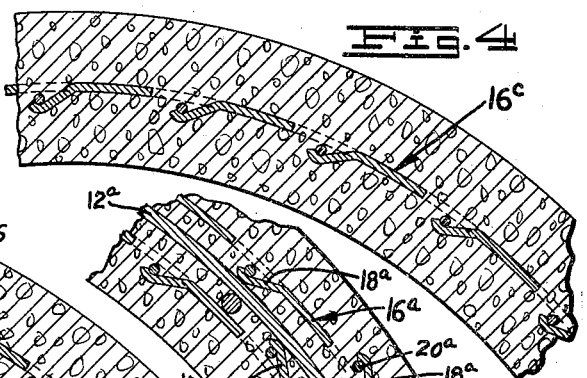
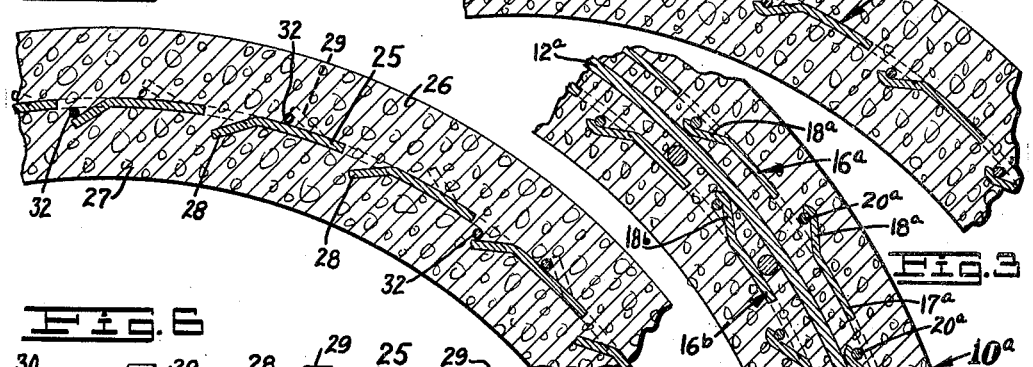
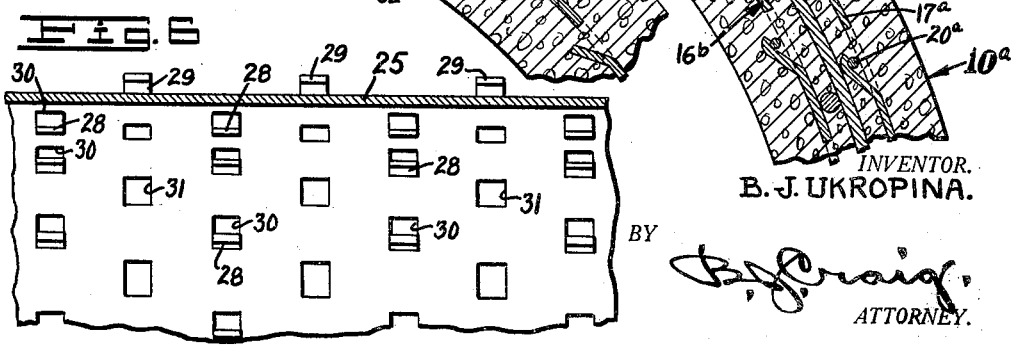
INVENTOR.
B. J. UKROPINA.
BY
ATTORNEY.

Patented Oct. 4, 1932

1,880,599

UNITED STATES PATENT OFFICE

BOZIDAR J. UKROPINA, OF LOS ANGELES, CALIFORNIA

CONCRETE PIPE JOINT

Application filed January 17, 1931. Serial No. 509,373.

This invention relates to improvements in concrete pipes.

The general object of my invention is to provide an improved means for reinforcing a concrete pipe.

Another object of the invention is to provide an improved reinforcing cage for concrete pipes which is constructed in a novel manner and possesses unique features which are a great advantage over the present type of reinforcing cages.

A specific object of the invention is to provide an improved means for reinforcing a concrete pipe.

Other objects and advantages of this invention will be apparent from the following description taken in connection with the accompanying drawing wherein:

Fig. 1 is a fragmentary cross section through a concrete pipe embodying the features of my invention.

Fig. 2 is a fragmentary side view of my improved reinforcing cage partly in section.

Fig. 3 is a fragmentary cross section of a concrete pipe showing a modified form of my invention.

Fig. 4 is a fragmentary cross section through a concrete pipe showing another manner of using my reinforcing cage.

Fig. 5 is a fragmentary cross section through a concrete pipe showing another modification of my invention, and Fig. 6 is a fragmentary longitudinal section through the reinforcing cage shown in Fig. 5.

Referring to the drawing by reference characters I have indicated a concrete pipe embodying the features of my invention generally at 10. As shown this pipe comprises a solid continuous metal tube 12 embedded between an outer layer of concrete 13 and an inner layer of concrete 14. Welded to the inner surface of the tube I provide a plurality of spaced rods 15 which are adapted to space a reinforcing cage 16 from the tube 12.

As shown the reinforcing cage 16 includes a plurality of spaced rings 17 which are spaced longitudinally along the length of the pipe. Each of the rings 17 are provided with a plurality of spaced tongues 18 which are stamped from the ring and bent inwardly and which leaves apertures 19 in the ring. Positioned between the tongues 18 and the inner surface of the rings 17 I provide longitudinally extending rods 20 and to prevent displacement of the rods 20 the ends of the tongues 18 are bent towards the rings as indicated at 21 to engage the rings and hold them in position during assembly.

The reinforcing cage 16 is preferably secured in position by welding the rings 17 to the rods 15. When the inner layer of concrete 14 is moulded on the tube 12 and the reinforcing cage 16 the concrete fills the aperture 19 in the rings 17 as clearly shown in Fig. 1.

In Fig. 3 I show a pipe 10a wherein a reinforcing cage 16a is disposed in the pipe. This cage 16a includes bands 17a having tongues 18a struck therefrom and having longitudinally extending reinforcing members 20a held in place by the tongues 18a.

A continuous imperforated tube 12a is arranged inside of the cage 16a and the tongues 18a are preferably secured to the tube 12a. A second reinforcing cage 16b similar to the cage 16a is arranged inside of the tube 12a and the tongues 18b are preferably secured to the tube 12a. Longitudinally extending rods 15 may be secured to the tube 12a and the cage 16b as shown in Fig. 3.

In connection with the cage 16b it will be noted that some of the tongues 18b are bent inwardly while others are bent outwardly, as indicated. This type of ring when used either inside or outside of the tube 12a will space itself from the surface of the tube and it may be free from the tube or it may be secured to the tube by welding the ends of the tongues thereto.

In Fig. 4 I have shown the reinforcing cage 16c similar to the cage 16 as used to reinforce a concrete pipe without the use of the metal tube 12.

In Figs. 5 and 6 I have shown a modification of my invention wherein a metal tube 25 is embedded between an outer layer of concrete 26 and an inner layer of concrete 27. The tube 25 is provided with a plurality of rows of inwardly bent tongues 26 which alternate with a plurality of rows of outwardly bent tongues 29. The tongues 28 are stamped from the tube and leave an aperture 30 and the tongues 20 leave an aperture 31. When the concrete is moulded on the tube 25 the concrete passes through the apertures 30 and 31 as clearly shown in Fig. 5.

If further reinforcing is desired, rods 32 similar to the rods 15 shown in Fig. 1 may be positioned between the tongues 28 and the inner surface of the tube 25 and they may be positioned between the tongues 29 and the outer surface of the tube 25 also if desired.

The pipes shown may have suitable bell and spigot ends thereon to make a fluid tight joint whereby a high pressure concrete pipe line for steam or similar high pressure duty is provided.

From the foregoing description it will be apparent that I have provided an improved concrete pipe including a novel reinforcing cage which is simple in construction and highly efficient in use.

Having thus described my invention, I claim:

1. A concrete pipe, said pipe including a metal tube embedded between an outer layer of concrete and an inner layer of concrete, a reinforcing cage, said cage including a plurality of spaced metal rings having tongues thereon, some of said tongues being inclined away from the adjacent surface of said tube, and other of said tongues being inclined towards said tube and a plurality of circumferentially spaced longitudinal rods, said rods being associated with said rings.

2. A concrete pipe, said pipe including a metal tube embedded between an outer layer of concrete and an inner layer of concrete, a reinforcing cage, said cage including a plurality of spaced metal rings having tongues thereon, some of said tongues being inclined away from the adjacent surface of said tube, and other of said tongues being inclined towards said tube, a plurality of circumferentially spaced longitudinal rods, said rods being positioned between the adjacent surfaces of said rings and said tongues, said second mentioned tongues engaging said tube and some thereof being secured to said tube.

3. A concrete pipe, said pipe including a metal tube embedded between an outer layer and an inner layer of concrete, a plurality of circumferentially spaced longitudinal rods secured to said tube, a reinforcing cage, said cage including a plurality of spaced metal rings having tongues thereon, said tongues being inclined away from the adjacent surface of said tube, a plurality of circumferentially spaced longitudinal rods, said last mentioned rods being positioned between the adjacent surfaces of said rings and said tongues, said rings being secured to said first rods.

In testimony whereof, I hereunto affix my signature.

BOZIDAR J. UKROPINA.